United States Patent [19]

Marks et al.

[11] 4,247,177
[45] * Jan. 27, 1981

[54] 3D MULTICHROME FILTERS FOR SPECTACLE FRAMES

[76] Inventors: Alvin M. Marks, 166-35 9th Ave., Whitestone; Mortimer Marks, 166-25 Cryders La., Beechhurst, both of N.Y. 11357

[*] Notice: The portion of the term of this patent subsequent to Jan. 16, 1996, has been disclaimed.

[21] Appl. No.: 3,624

[22] Filed: Jan. 15, 1979

Related U.S. Application Data

[62] Division of Ser. No. 757,838, Jan. 10, 1977, Pat. No. 4,134,644.

[51] Int. Cl.³ .............................................. G02C 7/10
[52] U.S. Cl. ...................... 351/44; 350/132; 350/313; 350/438; 351/163
[58] Field of Search ............... 350/132, 144, 195, 313, 350/317; 351/44, 163

[56] References Cited

U.S. PATENT DOCUMENTS

| | | | |
|---|---|---|---|
| 1,422,527 | 7/1922 | Berger | 350/317 |
| 4,134,644 | 1/1979 | Marks et al. | 350/132 |

*Primary Examiner*—John K. Corbin
*Assistant Examiner*—Scott J. Sugarman

[57] ABSTRACT

This invention relates to a system for photographing, presenting and viewing 3D images, in which a set of mutually extinguishing multichrome "C" and "D" filters in spectacles is utilized to cover a first eye with a "C" blue filter and a second eye with a "D" orange filter. The "C" blue filter transmits at 400 to 500 nm. The "D" orange filter absorbs from 400nm to 500 nm and transmits from 500 nm to 700 nm. Standard color film may be utilized to photograph stereo image pairs of the subject in which a first image is in blue, and a second image is in orange. With this system, one eye transmits a first stereo image in blue via retinal receptors to the brain and the other eye transmits a second stereo image in orange via other retinal receptors to another portion of the brain. Thus, the stereo images are separated according to their 3-dimensional displacements and color. The brain integrates the color and 3D information received by the two eyes to produce a full 3D color picture. The 3D color system of this invention is compatible with still and movie color photography, printing inks, and color 3D TV. For color 3D TV using a cathode ray tube color screen, the blue dots display the first stereo image and the green and red dots display the second stereo image. Another set of "A" and "B" mutually extinguising filters is described, which may be employed in lieu of the set of "C" and "D" filters. A 3D color camera using multichrome filter sets is described which may be modified for use with film or TV.

4 Claims, 8 Drawing Figures

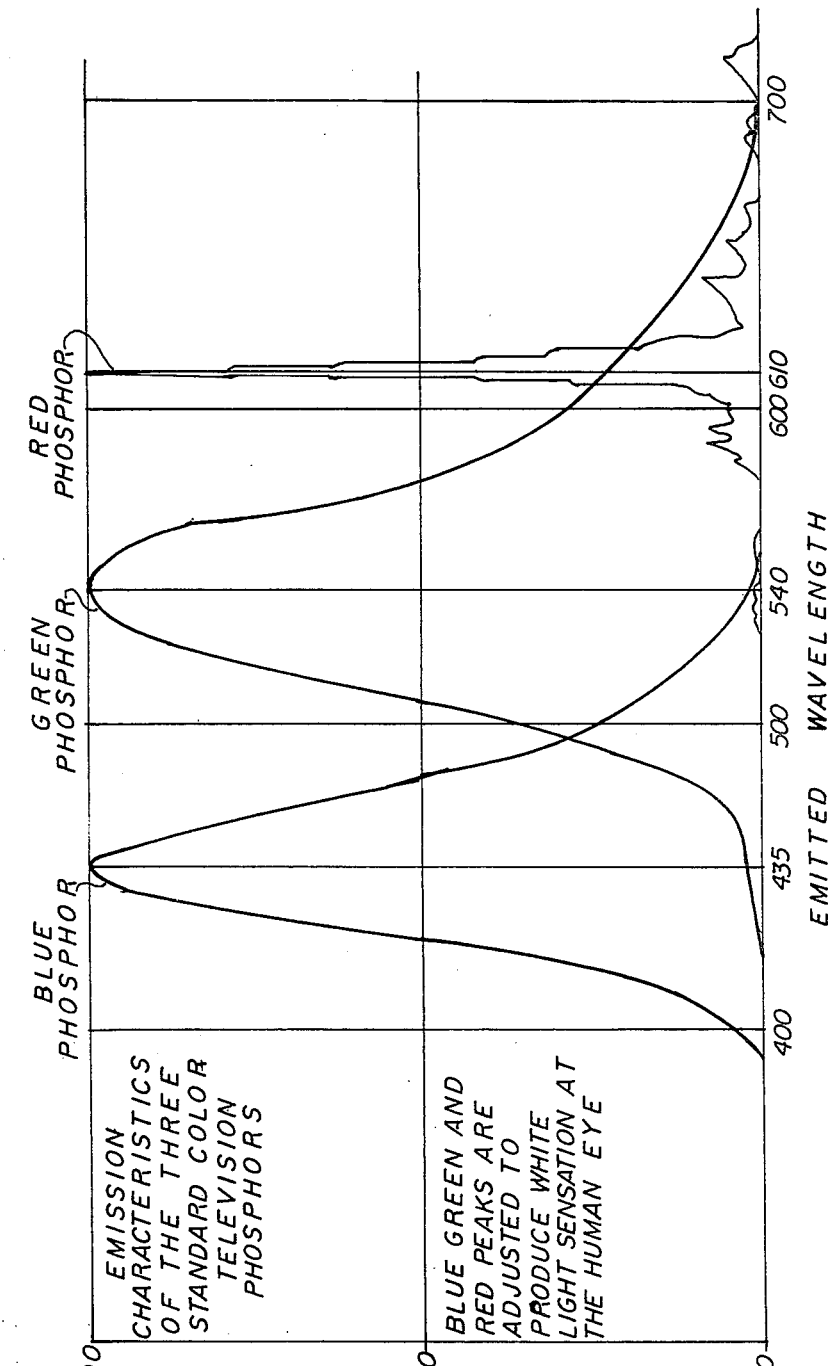

3D MULTICHROME FILTERS FOR SPECTACLE FRAMES

This application is a divisional of Ser. No. 757,838, filed Jan. 10, 1977, now U.S. Pat. No. 4,134,644, issued Jan. 16, 1979 to Alvin M. and Mortimer Marks, entitled "3-D Color Pictures with Multichrome Filters".

This invention relates to a system for viewing of 3-dimensional color presentations for print, photography, movies and TV.

A feature of this invention is its simplicity, low cost and compatibility with standard color printing, photographic, movie and TV presentations.

Another feature of this invention is the employment of an "A" band pass filter in the green for one eye and a "B" magenta filter which is a band stop filter for the green for the other eye. These A and B filters have specific wavelengths versus transmission characteristics balanced to provide the observer with a natural 3D color image; or, alternately, C and D filters.

A further feature of this invention is the employment of special colored films as filter material which may be mounted in cardboard viewers or spectacles which may be supplied in books, at the theater for movies, or at home for 3D color TV.

DEFINITIONS

The term "Multichrome A and B filters" shall herein mean two mutually extinguishing complementary colored filters which when worn each over one eye, produce the sensation of white, when viewing a white surface such as white paper under daylight conditions. The "A" filter shall transmit green 450 nm to 575 nm. The "B" filter shall transmit red 575 nm to 700 nm, and/or blue 400 nm to 575 nm. The "A" filter is termed the "green" filter and the "B" filter is termed the "magenta" filter. The "C" filter shall transmit blue light only 400 nm to 500 nm and the "D" filter shall transmit orange light only 500 nm to 700 nm.

The term "viewers" as herein used means multichrome filters (A and B, or C and D) in the form of sheets, film or laminated glass lenses mounted in a "spectacle" or "eyeglass" frame such as a plastic frame (as in U.S. Pat. No. 3,756,704, or in a cardboard frame.

The term "tail" of a phosphor is that portion of its emission spectrum which overlaps the emission spectrum of another phosphor of a different color.

BACKGROUND OF THE INVENTION

Color separation of stereo images has been utilized for over fifty years in the production of photographs, 3D movies and the printed page. However, in the prior art devices such as is shown in U.S. Pat. No. 3,712,119, the stereo images are separated by mutually extinguishing filters comprising a blue-green lens filters over one eye and a red filter on the other eye. With this combination, a full true color image is not obtained, and this color combination may cause eye fatigue, and color suppression.

In the present invention the mutually extinguishing filters comprising a special green color for one eye, and a special complementary blue and red color (rose or magenta) for the other eye are comfortable colors to wear; since green and "rose colored glasses" are used as sunglass colors. Idealized multichrome A and B filters, each with a neutral color, are shown in FIGS. 2 and 3 of U.S. Pat. No. 2,543,793, and described in column 6, line 45, to column 7, line 70. These are mutually extinguishing filters A and B with several complementary band pass and band stop characteristics from 400 nm to 700 nm. However, the multichrome filters disclosed in U.S. Pat. No. 2,543,793 are not applicable for the present invention. The filters employed in the practice of the present invention are not multichrome in the sense originally conceived in that they are not neutral color in appearance, rather they are green and magenta in color. However, the term "multichrome" may be employed for the filters of the present invention because the filters are mutually extinguishing; that is, one filter has a band stop characteristic, where the other filter has a band pass characteristic in the same wavelength ranges, and used together over two eyes, a sensation of white is perceived.

The multichrome filters of the present invention are complementary A and B filters defined as a green A filter with a single band pass characteristic and a magenta B filter with a single band stop characteristic; or preferably an A filter with a single band pass, and a B filter with a band stop and band pass characteristic at different portions of the spectrum, as will become apparent hereinafter.

The prior art multichrome filters could not be economically produced, since they were made using interference filters of the multilayer or polarizing type. We have now found dyestuffs to color plastic to make multichrome A and B filters as plastic sheets or films, which can be mounted into cardboard viewers at low cost usable with books, magazines, movies, photos and TV to provide a full-color 3D with comfortable viewing.

The filters of the present invention differ from the photopic/scotopic P and S filters disclosed in our U.S. Pat. No. 3,445,153, in that in contradistinction thereto the A and B filters of the present invention are mutually extinguishing filters, and there is a region of mutual transmission, particularly between 600 and 700 nm, as shown in FIG. 4 of the Patent. More blue light is transmitted in the present filter, resulting in a better balance between red, blue and green portions of the spectrum and better color vision.

The invention utilizes conventional means for the photography of the colored object in 3D; for example, 2 cameras displaced by an interocular distance using a conventional color-photographic film in each. The optical axes of these cameras are adjusted to converge at some point in the object space. For printing 3D color-images on paper in accordance with this invention, conventional color printing inks may be used. One of the images is printed in green and/or yellow and the other image is printed in red and/or blue. The stereo images are displaced in the printing. When seen without the multichrome viewer, printed objects varying greatly in depth appear blurred. However, upon placing the viewers over the eyes, the stereo image and colors are separated. The green and/or yellow color and one stereo image go to the right eye and the blue and/or red color and the second stereo image go to the left eye. The 3-dimensional color images are separated and these right and left colored images proceed via the different optical pathways to different portions of the brain which integrates all the information to provide a full-colored 3D picture.

In this system an object in a single pure color, red, green or blue, would be transmitted only to one eye and so would not appear in stereo. However, pure colors are rare, and most objects are off-white, or pastel shades, and so contain all three primary colors. Thus, most objects will have some component of each color and this enables the separation of right and left stereo images.

We have discovered that certain dyes may be used to achieve this result, which are disclosed hereinafter. These dyes are compatible with various plastic film substrates, such as cellulose acetate, polyvinyl acetate, etc., from which colored films may be produced and fabricated in a known manner to produce the multichrome viewers. To achieve a satisfactory color rendition with multichrome filter pairs A and B, we found that the transmission vs. wavelength characteristics of these colors is critical. A peak transmission averages more than 25% for the green-yellow filter at about 515–540 nm and its transmittance less than 1% from 400 to 475 nm, and from 575 to 700 nm. The magenta filter substantially absorbs the green (which includes yellow) color from 475 and 575 nm; that is, the transmittance is less than 1% in this range. To provide normal color vision, the color balance of the red transmission and blue transmission of the B filter is adjusted relative to the green transmission filter. For example, using 35% peak of the green A filter, the magenta B filter should peak at about 55% at about 435 nm and rise from less than 2% at 580 to about 80% at 700 nm.

While there is a related phenomenon known as "binocular or retinal rivalry"[1], we have made a discovery of a new phenomenon in 3D color vision which we term "interocular color suppression". In a set of mutually extinguishing color filters there is a critical choice for the transmission vs. wavelength curve to avoid interocular color suppression. In certain cases interocular color suppression may occur, in which the 3-color vision of both eyes is affected, so that a color in one eye (green) suppresses the color (red) in the other eye, and vice versa; the red and green colors may alternately fade and reappear in a disturbing manner; or may shift to a neutral shade or black. If the green peak is wide, a steady full 3-color image will appear. If the A filter green transmission is too great, relative to the B filter blue and red transmission, color suppression of red may occur. To see all the colors including white, the transmittances of the red, blue and green of the A and B filters must be balanced. Color TV tubes have relative 3-color emissions which have a relatively high intensity, and are balanced to produce a white sensation. Hence color TV tubes in combination with the A and B filters herein described are particularly suitable for 3D TV according to this invention.

[1]. Page 122, "The Science of Color", Committee on Colorimetry, Optical Society of America, Thomas Y. Crowell Co., 1953, Vail-Ballou Press, Inc., Binghamton, NY In the prior art filters BG and R shown in FIG. 1, the interocular color suppression is apparent in the dullness of the greens and reds, which are partially suppressed and this may be a cause of the eye fatigue experienced. With the "C" blue and "D" orange (red-green) filter set there is little or no interocular color suppression. The colors remain steady and bright.

Entertainment type color TV tubes utilize red, green and blue phosphors which have standard characteristics which vary little from manufacturer to manufacturer. For example, the Sylvania red phosphor No. 1130 has a peak of 610 nm and a half-width of 3.5 nm; Sylvania No. 1230 green phosphor has a peak of 540 nm and a half-width of 76 nm; and Sylvania No. 1310 blue phosphor has a peak of 435 nm and a half width of 56 nm. The red phosphor is Yttrium oxide or Yttrium oxysulfide, both of which are Europium-doped. The green phosphor is zinc sulfide which is silver-activated. The blue phosphor is also zinc sulfide activated with silver sulfide at a different quantum level.

If the scenes are transmitted in 3D TV, using a CRT (cathode ray tube) TV screen, the green phosphor is employed for a first stereo image to the first eye, and the blue and red phosphors are employed for the second stereo 3D image to the second eye.

In accordance with this invention, the A filter substantially transmits the green phosphor emission and substantially absorbs the blue and red phosphor emissions; and the B filter substantially transmits the blue and red phosphor emissions and substantially absorbs the green phosphor emissions. We have found that in a suitable concentration in a compatible transparent plastic film substrate, a green dye composition may be employed as an A filter; and a magenta dye composition may be employed as a B filter. Formulae for preparing A and B filters are given in Example 4; and for "C" and "D" filters in Example 5.

DESCRIPTION OF THE FIGURES

In the figures:

FIG. 6 shows a cutaway exploded isometric view of another embodiment of this invention in which there is provided a special lens screen over the TV face whereby the colored images are polarized and whereby the observer will wear polarized viewers instead of A and B viewers.

FIG. 7 shows a cutaway cross sectional detail of the device shown in FIG. 6.

FIG. 8 shows the spectral emission curves of color TV phosphors used on conventional entertainment type color TV cathode ray tubes (CRTs).

FIG. 1 shows a prior art system. This prior art system employs a blue-green filter shown in Curve BG, and a red filter shown in Curve R. With these filters interocular color suppression occurs which darkens the colors, and the blue, green-yellow, and red colors do not produce a natural 3-color image which may be the reason wearing these filters may cause eye fatigue.

Figure 2:
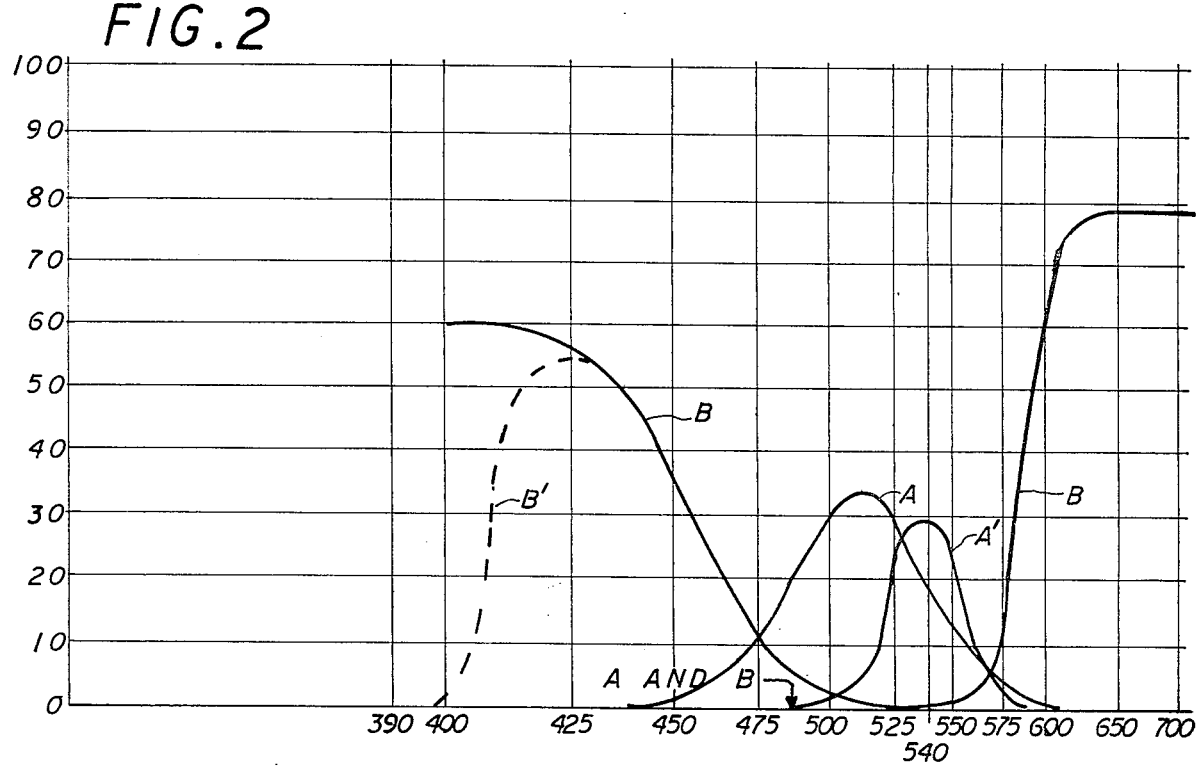
FIG. 2 shows a graph of transmittance vs. wavelength of the multichrome filters according to the invention.

The curves of filters used in the present invention are shown in FIG. 2. For example, in this system, a green filter A, represented by Curve A, is placed over the right eye. Curve A has a peak transmission which averages more than 25% at about 515–540 nm, and has a transmission of less than 1% at wavelengths less than 475 nm, or more than 575 nm. A red-blue filter B, represented by Curve B, is placed over the left eye. The curve transmission is 50 to 70% at 435 nm, decreases from 435 to 500 nm to less than 1% between 475 and 575 nm, and increases from 575 nm to about 80% at 700 nm. Optionally, in the B filter, an added UV absorber produces a peak at 435 nm, shown as B'. Hereinafter, reference to Curve B shall optionally include B'.

With this system, suitable printing inks for color printing on a white paper may be selected and employed for 3D color printing for all purposes, as in photographs and illustrations for literature, magazines, books and the like. For example, a red printing ink which has a large reflectance from 575 to 700 nm and a small reflectance from 400 to 575 nm may be used which follows the right portion of the curve B and a blue ink may be used with a large reflectance from 400 to about 450 nm which follows the left portion of the Curve B. A green ink may be used having a large reflectance from about 450 to 575 nm following the curve A. The same dyes used in the plastic films for the viewers may be employed in formulating transparent inks, the reflection being provided by the white paper on which ink is printed.

Figure 3:
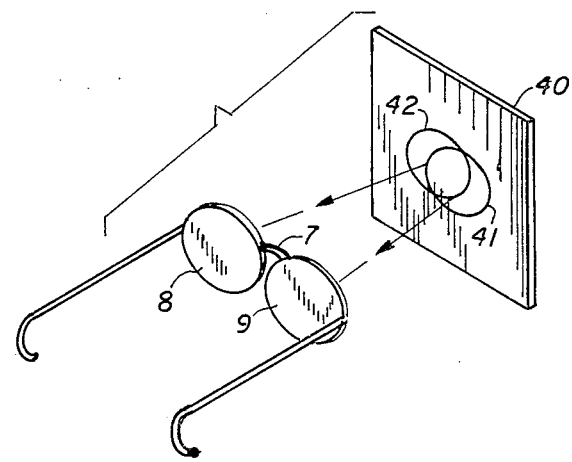
FIG. 3 is a diagrammatic perspective view of a 3D color print and the viewers according to this invention.

FIG. 3 diagrammatically shows a viewer with A and B filters and a page photographed or printed with 3D color images according to this invention in which the 3D stereo image pairs on the sheet are formed by photographic-color dyes or printed color inks corresponding to Curves A and B of FIG. 2.

These images are viewed through the viewer 7 which comprises an "A" green filter 9 for the right eye and a "B" magenta filter 8 for the left eye, these colors being transparent filters chosen in accordance with the Curves A and B shown in FIG. 2.

In FIG. 3, printing inks are employed on paper sheet 40 to form the right and left 3D color images, respectively 41 and 42. The right image is printed in green and/or yellow ink. The left image 42 is printed with a red and/or blue ink thus forming a 3D color image. The inks employed to produce color rendition to conform with Curve A and the red and/or blue portions of the Curve B are selected standard or preferably special inks formulated with the hereinafter disclosed dyes. In the printing, the green-yellow image 41 is displaced from the blue/red image 42, and these images are separated by the viewer A and B filters, and each eye of the observer sees only one of the images of the stereo pair.

EXAMPLE 1—3D Color Photography—Color Transparencies

Three D color photography in accordance with this invention may use the magenta sheet 3M (Minnesota Mining and Manufacturing Co.) No. 354 and as the green, 3M color sheet No. 185.

Photography of images according to this invention may be accomplished utilizing the conventional methods of still, motion picture, or television techniques. For still photography, it is well known to utilize two lenses separated by the average human interocular distance of about 67 mm, and to take two separate color images.

EXAMPLE 2—3D Color Printing—Colored Inks

On the colored printing inks which may be employed, reference is made to certain standard "Pantone" color ink colors and special ink colors available from any manufacturer of colored inks. There may be used, for example for the red, Dupont Oil Red or Orasol Red 2B; for the blue, Pantone Process Blue or Pantone 300; for the magenta Fuchsine. Light from these inks on a white paper are transmitted only through B filter. For a green color use dyes such as in Example 4, Formula A and for the yellow color Pantone yellow, or No. 396 is transmitted only through the A filter. These Pantone and special ink colors comprise all the red, blue, green and yellow components to make a 3D color print. Other special inks may be formulated in accordance with this invention.

According to the prior art, these images may be projected, overlapped onto a screen and viewed through mutually extinguishing blue-green and red; or polarized filters. In the present invention, projection is made through the mutually extinguishing A and B filters and viewed through viewers with a set of A and B filters; these filters now being green and magenta to form a color image in 3D. Alternatively, "C" and "D" filters may be used.

Figure 4:
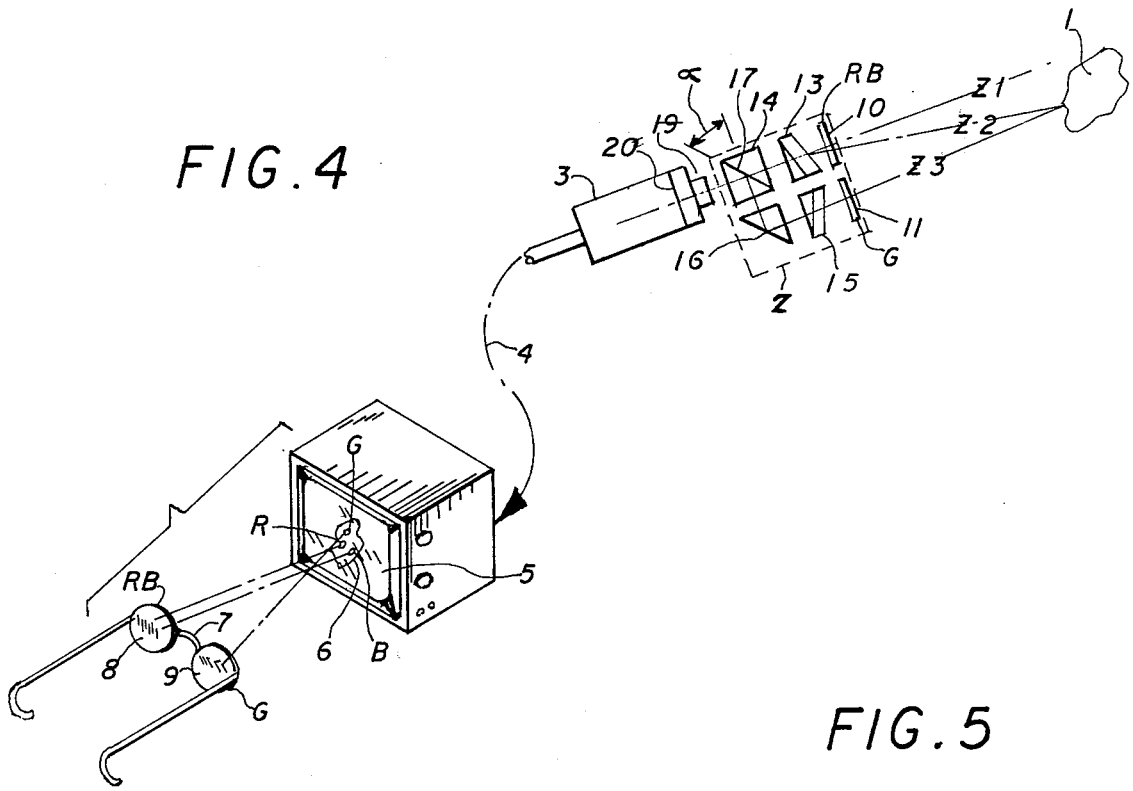
FIG. 4 shows a diagram of a 3D TV system including the viewers of this invention.

FIG. 4 shows a 3D TV color image system comprising an object 1, a novel 3D converter device 2, and a conventional TV camera 3. Television images are transmitted to the receiver via a cable or space channel 4. The TV screen 5 is shown with an enlarged area 6 showing a detail of the red, green and blue phosphor dots (or other shape) and a viewer 7 containing the A and B filters. Light from the green dot is transmitted only through the A filter and light from the red and blue dots is transmitted only through the B filter. The green dot carries only the right stereo and green-yellow image information; while the red and blue dots carry only the left stereo blue and/or red image information. The depth information needed by the brain to produce a 3D image is provided by the varying displacement between the right and left images. Such images seen without the viewers appear blurred particularly for considerable displacement between image pairs; but such stereo images appear as a full color 3D image when the viewers are worn.

In FIG. 4 there is shown a novel 3D converter device 2, in which the construction is similar to that shown in our U.S. Pat. No. 3,990,087 entitled "3-Dimensional Camera", except that the multichrome filters A and B, respectively 10 and 11 in the drawing, are substituted for polarizing filters and the images are overlapped in the color camera 3; that is, the images are not split into 2 images and arranged one above the other as shown in the aforesaid patent. As in this patent, the single camera lens 19 is utilized and the converter 2 is external to the camera lens. The converter device provides for the adjustment of the convergence of the optical axes of the right and left images through the rotation of the reflecting beam splitter 14 through a small angle α of about 1°. The converter 2 comprises respectively the A and B filters 10 and 11, achromatic prisms 13 and 15, a fixed total internal reflecting prism 16, and a beam splitter cube 14 having approximately 40% reflectance at the plane 17 and a 40% transmittance at the same plane. A preferred alternative to the use of the multichrome filters 10 and 11 is to eliminate said filters and to substitute therefor a multilayer coating on the diagonal 17 within the beam-splitter cube 14. This multilayer coating 17 has the property of reflecting green between 475 and 575 nm and transmitting blue between 400 and 475 nm and red between 575 and 700 nm. This system is very efficient and much simpler than the first alternative. The herein described multilayer coating is well known in the art and is termed a dichroic beam-splitter. The lens focus and the convergence may be correlated, or may remain independent, as also described in the aforesaid patent. Alternatively, the same camera converter as shown in the patent may be employed with the stereo images one over the other, and in such case a projected 3D TV color image may be made using the POLARATOR TM projection optics described in U.S. Pat. No. 3,851,955, using A and B filters instead of polarized filters. For improved light efficiency because of their greater transmission, the A and B filters may be interference filters, rather than dye-film filters.

Figure 5:
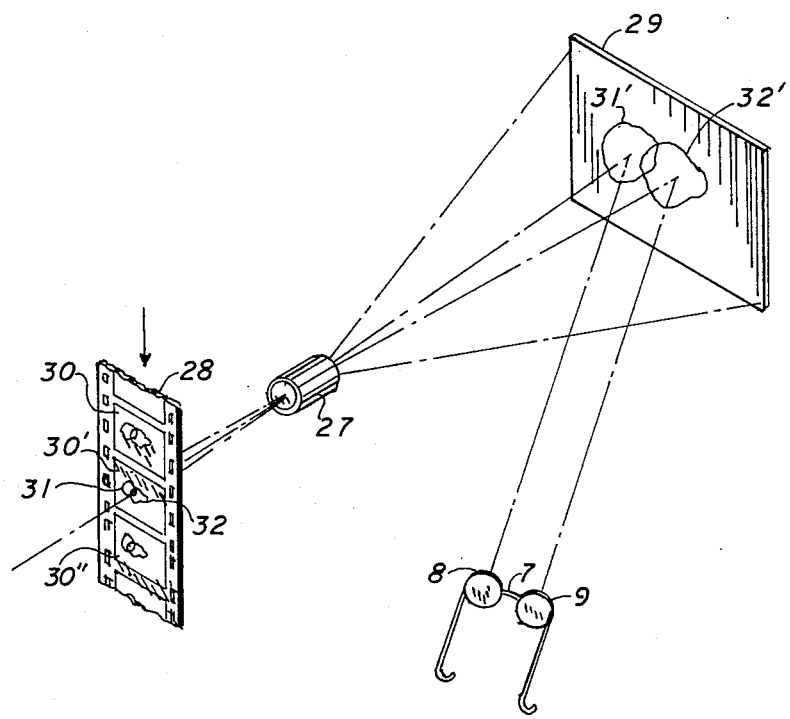
FIG. 5 shows a diagrammatic perspective view of a 3D color motion picture projector system including the viewers of this invention.

FIG. 5 shows a motion picture projection system utilizing a standard projector and a film specially printed with A and B dyes to show 3D color motion pictures using the viewers of this invention. The system employs a standard motion picture film projector and a full frame color picture printed with images displaced; the A image 31 and the B image 32 are simultaneously projected through the projector lens 27 onto a standard white reflective screen 29, these images being seen through the viewers of this invention.

In printing the colored images 31 and 32 on the film 28 the dye-colors are selected in accordance with the Curves A and B of FIG. 2. If mutually extinguishing dyes are not employed, then the images seen will show "ghosting"; that is, a mixture of right and left images is seen through the multichrome viewers, blurring the projected 3D color image. This problem may be avoided by printing the film 28 with standard 3-color separation dyes in the usual manner, and employing the projection optical device shown in FIG. 6, which is the same as shown in FIG. 13 of U.S. Pat. No. 3,851,955, known as the POLARATOR TM, and described therein. In this case, the images differ from that shown in the film of FIG. 28 in that the right and left images are placed one above the other. These images are projected through the POLARATOR TM onto the screen where the images would normally be viewed with polarized viewers instead of multichrome viewers containing A and B filters. By utilizing the POLARATOR TM attachment, with A and B filters replacing the polarized filters, colored images are provided which can be separated by the A and B filters of the viewer 7, and the resulting image is seen in full color 3D. An advantage of using the multichrome A and B filters, rather than polarized filters, is that an ordinary white (non-silvered, non-metallized) screen may be employed, which facilitates the showing of 3D movies in theaters not equipped with the silver-metallized-reflecting screens. The film used in this projection may be photographed using the above described 3D camera device.

Referring now to FIG. 6, there is shown a cutaway, exploded isometric view of another embodiment of this invention employing a discriminating screen. The inner surface of the standard CRT tube has a phosphor screen 54 upon which the three phosphors, red, green and blue are placed; respectively numbered 51, 52, and 53. The discriminating screen 55 contains a lenticulated lens surface 56 shown as a honeycomb structure in which the lenses are abutting spherical lenses in a hexagonal pattern 58, 59, and 60. The forward surface 57 of the screen supports the blue, green and red filter elements 61, 62, and 63, respectively. These filter elements comprise separate blue, green and red band pass filters for the blue, green and red emissions of the phosphors. The viewer 66 comprises an A filter 64, and B filter 65. However, according to this invention, in another embodiment thereof, in addition to the band pass filters at 61, 62, and 63, there are placed thereover polarizing filters. These polarizing filters may have the conventional orientation of 3D viewers utilized for viewing 3D movies, which are standard and obtainable commercially at low cost.

These conventional polarized viewers are polarized with a 135° polarized axis for the right polarized filter and a 45° polarized axis for the left eye polarized filter. The green dots are overlaid with polarized filters oriented with their polarizing axes at 135° and these rays pass only through the right eye, but not through the left eye. The red and blue dots are overlaid with polarizing filters oriented at 45°, and these rays pass only to the left eye and not to the right eye. The advantage of this is that the observers see a color 3D image by looking through neutral (polarized) lenses.

FIG. 7 shows a cutaway detail side view of the assembly of the outer portion of the CRT face plate containing the phosphors 52 and 53, green and blue, respectively, the red filter being hidden in this view. A discriminating screen 55 which has an inner surface 56 and an outer surface 57 is placed over the CRT. The discriminating screen 55 has an inner surface 56 on which lenticulated lenses are formed and has an outer surface 57 on which the filters 61, 62, and 63 are placed. The images of the red 51, green 52 and blue 53 phosphors are focused by the lenses 58, 59 and 60 onto the filter areas 61, 62 and 63.

For entertainment color TV CRTs, the three color phosphors, blue, green and red have peaks at the dominant wavelengths 433, 540 and 610, respectively, and are adjusted to emit radiant powers, in such ratios that white light is perceived by the observer. Consequently, the ideal A and B filters according to this invention are a pair of neutral density (equal transmission vs. wavelength) filters for specific wavelength ranges. The A filter totally absorbs the red and blue components only and is neutral (equal transmission) for the green-yellow wavelengths. The B filter is neutral for the blue and red components and totally absorbs the wavelengths of the green component.

Referring to FIG. 8, there is shown the blue, green and red phosphors which have the different band widths and tails. The red phosphor has a major emission in the red, and a minor tail in the green. The green phosphor has its major emission in the green portion of the spectrum, and tails in the blue and red. The blue phosphor emits in the blue region of the spectrum with a tail in the green. An important and unexpected result of this invention is that the A and B filters decrease or eliminate the phosphor tails.

By the use of this discriminating screen 55, the phosphor emissions are sharpened, the tails and the cross talk eliminated.

The green tails of the red phosphor and blue phosphor are eliminated by the B filter which absorbs in the green. The green emission is transmitted by the A filter, and the green tails of the red and blue phosphors are transmitted to a lesser extent. The blue tail of the green emitter is eliminated by the A filter. Thus, the A and B filters of this invention in combination with the red, blue and green phosphors produce a new and useful result, that is, elimination or decrease of the tails of the red, blue and green phosphors; which improves image contrast and resolution, increases the color saturation, decreases the "cross talk" between the two image channels, enabling the right and left images to be better distinguished from each other. If the phosphor tails are not clipped, the right and left images become confused causing blurring or imperfection of the 3-dimensional image.

In FIG. 8 all peaks are plotted to the same height. The eye corrected relative integrated energy distributions are green 100, blue 18.5 and red 32.3, at the peaks 540, 433, and 610 nm, respectively.

To completely eliminate the cross talk between the images transmitted via the green and red/blue channels, it is preferred to employ selective red, green and blue filters over each of the filter dots. In practice, this is difficult to do because the dyes employed are organic and the phosphors and inorganic and fired along with the glass at temperatures so high as to destroy the organic dyes. However, ceramic colors can be fused into the glass in a dot pattern within a color CRT, and the phosphors deposited thereon.

The device shown in FIG. 6 filters the output of the red, blue and green filters to obtain pure filter colors, in which the tails of the red, blue and green phosphors and all cross talk between the two channels are substantially eliminated; that is, the red colors and blue colors go only through the B filter and the green color only through the A filter.

Figure 1:
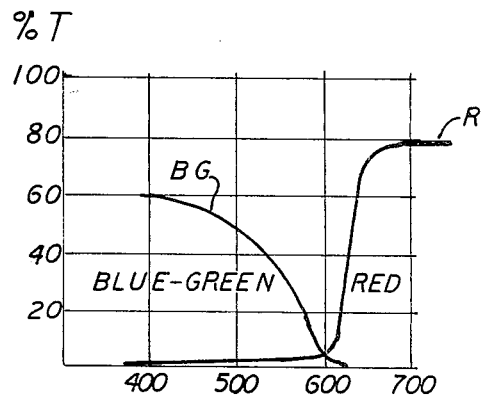
FIG. 1 shows a graph of transmittance vs. wavelength of a prior art 3D color system using blue-green and red filters.

If the interference type filters are employed neutral density filters closely matching these characteristics may be obtained and used in carrying out this invention, and are the most efficient in overall transmittance. These A and B filters of the interference type may be practically employed in 3D movie or TV projectors; for example, to replace the polarizers on the POLARATOR TM, the optical device previously described in U.S. Pat. No. 3,851,955, entitled "Apparatus for Converting Motion Picture Projectors for Stereo Display", FIG. 1. However, interference type A and B filters are expensive. For the general audience, the plastic film dye type A and B filters are preferred because they are relatively inexpensive. Such plastic film dye A and B filters utilize selected dyestuffs to approximate the optimum characteristics above described.

Plastic film dye compositions are hereinafter described which employ a selection of commercially available dyes to approximate the optimum characteristics of the A and B filters; and C and D filters.

The light emissions of the red, green and blue phosphors of the color TV Cathode Ray Tube (CRT) are balanced to produce a good color reproduction. According to this invention, the A and B filter transmittances are adjusted to maintain the resultant emission-transmissions of the 3 colors in the same relative proportions as the said 3-color emission.

EXAMPLE 3-Multichrome A and B 3D Viewers - Film Casting Compositions

We have found for example suitable concentrations hereinafter specified of the dyes in a plastic substrate may be employed as an A filter to transmit the green TV phosphor and to substantially absorb the blue and red TV phosphor emissions respectively. The B filter substantially transmits the emissions from the red and blue phosphors, and substantially absorbs the emission from the green phosphor. In combination, a balanced color reproduction is obtained with A and B 3D viewers used for observing a color 3D-TV presentation.

In the multichrome viewers, the A and B filter lenses are preferably prepared by the incorporation of selected dyes dissolved in a thin plastic film. The thin plastic film is a polymer composition such as cellulose acetate, cellulose acetate butyrate, polymethyl methacrylate, and the like. In manufacturing such a filter-film, the selected compatible dyes are dissolved in a solvent and mixed with the polymer. This polymer-dye-solvent mix is then cast to form a continuous film on a suitable belt, stripped, dried, and cut into lenses and mounted in the viewers of this invention. The "A" filter-film contains dyes to provide a wavelength-transmission characteristic according to Curve A, and the "B" filter-film has a red-blue characteristic according to Curve B of FIG. 2.

Alternatively, other methods well known to those skilled in the art of incorporating the dyestuffs into plastic sheets may be employed, such as: surface coating, imbibition, etc.

We have found for example that Orasol Blue 2 GLN, Pylakrome Yellow and Azosol Fast Brilliant Red B in suitable concentrations hereinafter specified in a plastic substrate may be employed as an A filter, to transmit green-yellow and to substantially absorb the blue and red components; and, the magenta dye acid Fuchsine and Orasol Red BL, in suitable concentrations hereinafter specified in a plastic substrate may be employed as a B filter to substantially absorb the green TV phosphor emission and to substantially transmit the blue and red TV phosphor emissions respectively.

Formulae A and B hereinafter disclosed have the above described properties and have been designed for use with 3D color CRT sets whose blue, green and red phosphors have the herein described standard characteristics.

These formulae are also suitable for 3D presentations using color printing, still and movie photography.

The dyes are incorporated in a suitable concentration in the film to provide curves similar to A and B, shown in FIG. 2. Formulae A and B shown in Table I, hereinafter, may be employed to produce the A and B filter films useful in the practice of this invention for a dry film nominal thickness of 1 mil (40μ). By changing the dye concentration in the polymer, the film thickness may be varied from 0.3 to 1.5 mils (12–60μ) for a coating on a transparent substrate such as cellulose acetate; or from 1 to 5 mils (40 to 200μ) for a self-supported film.

Another embodiment within the scope of this invention is to employ another mutually extinguishing pair of "C" and "D" multichrome filters; in which, referring to FIG. 2, is a blue filter which follows only the left part of the curve marked "B" or "B'" and "D" is an orange filter (similar to Wratten G) rising sharply upward at about 500 nm and transmitting green-yellow, orange and red colors. In this case one stereo image is transmitted by blue light, and the other stereo image is transmitted by red and/or green and/or yellow light. An advantage of this pair of mutually extinguishing filters is that the interocular color suppression does not occur in this case particularly since red and green are seen together by the same eye. The selection of colors for printing and photography is not critical.

The C and D filters also have the property of S and P filters to induce scotopic vision in one eye and photopic vision in the other eye. Moving flat pictures are seen in induced time-delay 3D, as described in U.S. Pat. No. 3,445,153. In this Patent the red and blue components provided the scotopic vision, while the green-yellow component provided the photopic vision; whereas with C and D filters, the photopic vision is provided by the green-yellow and red wavelengths, and the scotopic vision solely by the blue wavelengths. The "C" and "D" filters produce a stronger 3D effect than the P and S filters of the prior art.

The new phenomena of "interocular color suppression" causes red colors to darken to a neutral or black. The extent to which interocular color suppression occurs varies with the individual. For practical applications, it is necessary to provide a multichrome A and B filter set which enables most individuals with normal eyesight and color vision to see a full color spectrum, without the occurrence of the objectionable phenomena of interocular color suppression.

We have made the discovery that interocular color suppression is eliminated using a broad spectrum green having a peak at about 515 nm and a wide bandwidth, as shown in FIG. 2, Curve A.

The A green filter shown in Curve A is neutral-blue-green and includes all the colors between about 450 and 575 nm; that is, blue-green 515 nm, green 540 nm, yellow 565 nm and yellow-orange 575 nm. In contradistinction interocular color suppression occurs with the green filter shown in Curve A', which has a sharp peak at 540 nm and a relatively narrow bandwidth.

A composition which produces an A filter having the characteristics shown in FIG. 2, Curve A is given in Example 4.

TABLE I

FORMULAE A AND B COMPOSITIONS IN PARTS BY WEIGHT

FORMULA A (GREEN)

| Material | Mfgr. | DYE* Color Index No. | Total Solution | Total Solids | % Solids |
|---|---|---|---|---|---|
| Orasol Blue 2 GLN | CG | Solvent Blue 48 | 3.34 | 3.33 | 2.67 |
| Pylakrome** Yellow 20867 | PY | — | 0.83 | 0.83 | 0.67 |
| Azosol Fast*** Brilliant Red | GAF | Solvent Red 33 | 0.17 | 0.17 | 0.14 |
| Cellulose Acetate | EK | | 120.00 | 120.00 | 96.52 |
| Ethyl Alcohol | | | 122.83 | | |
| Nitropropane | | | 122.83 | | |
| Diacetone alcohol | | | 390.00 | | |
| Acetone | | | 240.00 | | |
| TOTALS | | | 1000.00 | 124.33 | 100.00 |

% Solids = 12.4

FORMULA B (MAGENTA)

| Fuchsine Acid | CG | Violet 7 | 0.31 | 0.31 | 0.25 |
|---|---|---|---|---|---|
| Orasol Red 2 BL | CG | Red 132 | 0.19 | 0.19 | 0.15 |
| Cellulose acetate | EK | | 120.00 | 120.00 | 99.60 |
| Ethyl alcohol | | | 124.75 | | |
| Nitropropane | | | 124.75 | | |
| Diacetone alcohol | | | 390.00 | | |
| Acetone | | | 240.00 | | |
| TOTALS | | | 1000.00 | 120.50 | 100.00 |

% Solids = 12.0

| Manufacturers: | CG | Ciba Geigy |
|---|---|---|
| | PY | Pylam Products Co. |
| | EK | Eastman Kodak |

TABLE I-continued

FORMULAE A AND B COMPOSITIONS IN PARTS BY WEIGHT

| | GAF | General Aniline & Film Co. |
|---|---|---|
| | AMS | Ridgway Color & Chemical |

*Journal of the American Association of Textile Chemists and Colorists, PRODUCTS '77, July 1976, Vol. 8, No. 7A
**Orasol Yellow 2GN Color Index No. 88 may be substituted.
***Eosine (AMS) Acid Red 87 may be substituted for the Azosol Fast Brilliant Red B (Solvent Red 33).

As herein described, there has been provided novel multichrome A and B or mutually extinguishing green and magenta filters, in a system to present and view 3D color images in printe, photography, still or movies, and TV. Alternatively "C" blue and "D" orange (green-red) transmitting filters may be employed. The curves shown in FIG. 2 are illustrative, but are not to be considered limiting, of the transmittance characteristics vs. wavelength of the A and B filters. Various modifications and substitutions in the formulas given herewith may be made, which will vary these curves, but which, however, so long as they perform the function of A and B filters or C and D filters do not depart from the scope of this invention.

EXAMPLE 5

Blue dyes for formulating the "C" filters are for example iron phthalocyanine blue and Fuchsine, or Calco oil blue ZV (solvent blue 58). An orange dye suitable for formulating the orange "D" filter is; for example, Pylam Oil Orange (Solvent yellow 14).

Having thus fully described the invention, what is claimed and sought to be protected by United States Letters Patent is:

1. As articles of manufacture a complementary mutually extinguishing filter set of C and D filters, said filters comprising respectively blue and orange colored plastic sheets, said C filter containing dyes having the transmittances of 25 to 80% from 400 nm to 500 nm, decreasing from 435 nm to less than 1% from 500 nm to 700 nm, and said D filter containing dyes having a transmittance of less than 1% from 400 to 500 nm rising to a transmittance at about 515 nm of 30 to 50%, and increasing to about 80% at 700 nm.

2. An article of manufacture comprising a set of C and D filters according to claim 1 mounted in a spectacle frame.

3. As articles of manufacture a complementary mutually extinguishing filter set of A and B filters, said filters comprising respectively green and magenta colored plastic sheets.

4. An article of manufacture comprising a set of A and B filters according to claim 3 mounted in a spectacle frame.

* * * * *